(12) United States Patent
Saito

(10) Patent No.: US 8,210,986 B2
(45) Date of Patent: Jul. 3, 2012

(54) HYBRID VEHICLE DRIVE CONTROL APPARATUS

(75) Inventor: Katsuyuki Saito, Hadano (JP)

(73) Assignee: Nissan Motor Co., Ltd., Yokohama (JP)

( * ) Notice: Subject to any disclaimer, the term of this patent is extended or adjusted under 35 U.S.C. 154(b) by 256 days.

(21) Appl. No.: 12/811,486

(22) PCT Filed: Feb. 23, 2009

(86) PCT No.: PCT/IB2009/000330
§ 371 (c)(1),
(2), (4) Date: Jul. 1, 2010

(87) PCT Pub. No.: WO2009/109821
PCT Pub. Date: Sep. 11, 2009

(65) Prior Publication Data
US 2010/0292047 A1    Nov. 18, 2010

(30) Foreign Application Priority Data
Mar. 3, 2008    (JP) .................................. 2008-052445

(51) Int. Cl.
*B60K 1/02* (2006.01)
(52) U.S. Cl. ........................................................... 477/3
(58) Field of Classification Search ................... 477/3, 5
See application file for complete search history.

(56) References Cited

U.S. PATENT DOCUMENTS

| | | | |
|---|---|---|---|
| 6,857,985 B2* | 2/2005 | Williams | 477/5 |
| 7,520,352 B2* | 4/2009 | Hoshiba et al. | 180/65.29 |
| 7,533,744 B2* | 5/2009 | Mack | 180/65.265 |
| 7,565,939 B2* | 7/2009 | Ando et al. | 180/65.28 |
| 7,708,095 B2* | 5/2010 | Hirata | 180/65.275 |
| 7,826,941 B2* | 11/2010 | Hayashi et al. | 701/22 |

FOREIGN PATENT DOCUMENTS

| | | |
|---|---|---|
| JP | 2000-30753 A | 1/2000 |
| JP | 2000-125415 A | 4/2000 |
| JP | 2000-324616 A | 11/2000 |
| JP | 2001-268708 A | 9/2001 |
| JP | 2007-185986 A | 7/2007 |

OTHER PUBLICATIONS

Extended International Search Report of the corresponding International Application No. PCT/IB2009/000330.

* cited by examiner

*Primary Examiner* — Dirk Wright
(74) *Attorney, Agent, or Firm* — Global IP Counselors, LLP (57) ABSTRACT

A hybrid vehicle drive control apparatus is basically provided with an engine, a motor/generator, an electric power source and a controller. The electric power source exchanges electric power with the motor/generator. The controller selects between an EV drive mode in which a drive force is produced solely from the motor/generator and an HEV drive mode in which the drive force is at least partially produced from the engine. The EV drive mode and the HEV drive mode are based on at least a state of charge of the electric power source. The controller changes a state of charge region in which the EV drive mode is selected based on a degradation degree of the electric power source such that as the degradation degree of the electric power source becomes larger, the state of charge region in which the EV drive mode is selected becomes larger.

7 Claims, 5 Drawing Sheets

HYBRID VEHICLE DRIVE CONTROL APPARATUS

CROSS-REFERENCE TO RELATED APPLICATIONS

This U.S. National stage application claims priority to Japanese Patent Application No. 2008-052445, filed on Mar. 3, 2008. The entire disclosure of Japanese Patent Application No. 2008-052445 is hereby incorporated herein by reference.

BACKGROUND

1. Field of the Invention

The present invention generally relates to a hybrid vehicle drive control apparatus for a hybrid vehicle having an electric drive (EV) mode a hybrid drive (HEV) mode. More specifically, the present invention relates to a hybrid vehicle drive control apparatus for a hybrid vehicle that changes an EV drive region in accordance with degradation of an electric power source.

2. Background Information

In recent years, advances are being made in the development of hybrid vehicles that use an engine and a battery as power sources. In particular, numerous hybrid vehicle technologies are being developed in relation to a state of charge (SOC) and a degradation state of a battery used as an electric power source. For example, there is a known control technology that varies the input and output power of a battery of a hybrid vehicle in accordance with a degree of degradation of the battery (e.g., see Japanese Laid-Open Patent Publication No. 2000-125415). There is also a known control technology that changes a threshold value used to determine if an idle stop should be permitted in a hybrid vehicle having a battery. This control changes the threshold value to a value corresponding to a higher battery SOC when the battery of the hybrid vehicle has become degraded (e.g., see Japanese Laid-Open Patent Publication No. 2001-268708).

In view of the above, it will be apparent to those skilled in the art from this disclosure that there exists a need for an improved hybrid vehicle drive control apparatus. This invention addresses this need in the art as well as other needs, which will become apparent to those skilled in the art from this disclosure.

SUMMARY

In the existing technologies described above, the control of the hybrid vehicle is changed in accordance with a degradation degree of the battery. However, the existing technologies described above do not consider a control that focuses on an amount of time (i.e., a distance) during which the vehicle travels continuously using only a motor. Consequently, as the battery degrades, the amount of time the vehicle can travel continuously using only the motor (hereinafter called "EV continuous travel time") decreases, assuming the state of charge of the battery is the same at the time when travel using only the motor starts.

The present invention was conceived in view of this problem. One object of the present invention is to provide a hybrid vehicle drive control that can secure an EV continuous travel time (distance) that is the same when the battery has degraded as when the battery was new.

In order to achieve the object described above, a hybrid vehicle drive control apparatus basically comprises an engine, a motor/generator, an electric power source and a controller. The electric power source is operatively coupled to exchange electric power with the motor/generator. The controller is configured to select between an EV drive mode in which a drive force is produced solely from the motor/generator and an HEV drive mode in which the drive force is at least partially produced from the engine. The EV drive mode and the HEV drive mode are based on at least a state of charge of the electric power source. The controller is further configured to change a state of charge region in which the EV drive mode is selected based on a degradation degree of the electric power source such that as the degradation degree of the electric power source becomes larger, the state of charge region in which the EV drive mode is selected becomes larger.

These and other objects, features, aspects and advantages of the present invention will become apparent to those skilled in the art from the following detailed description, which, taken in conjunction with the annexed drawings, discloses preferred embodiments.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
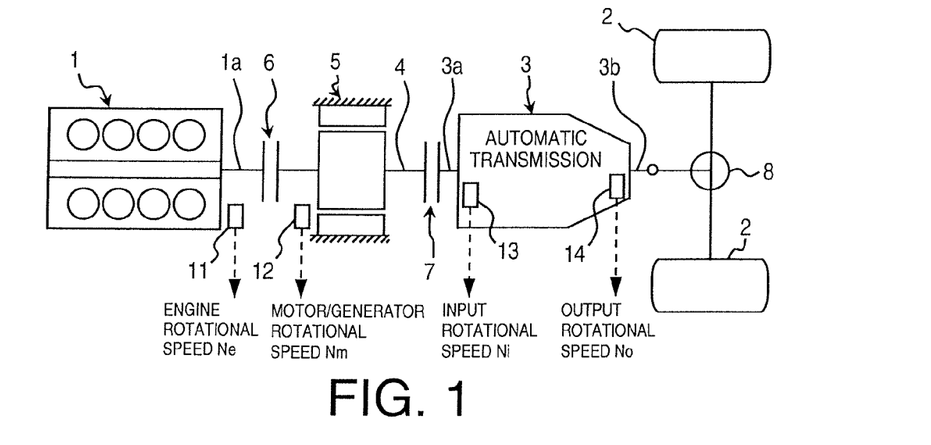
FIG. 1 is a schematic view of a power train of a hybrid vehicle (front-engine, rear-wheel-drive) which is equipped with a hybrid vehicle drive control apparatus in accordance with one embodiment.
Figure 2:
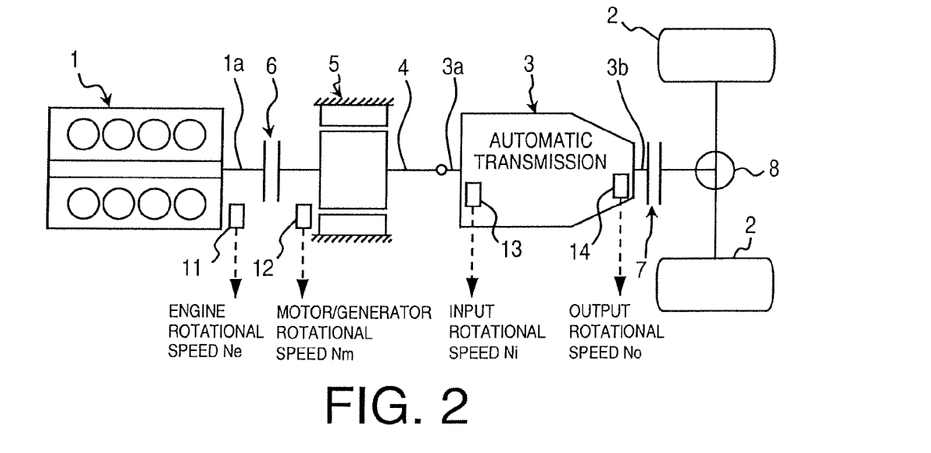
FIG. 2 is a schematic view of a power train of another hybrid vehicle which is equipped with the hybrid vehicle drive control apparatus in accordance with another embodiment.
Figure 3:
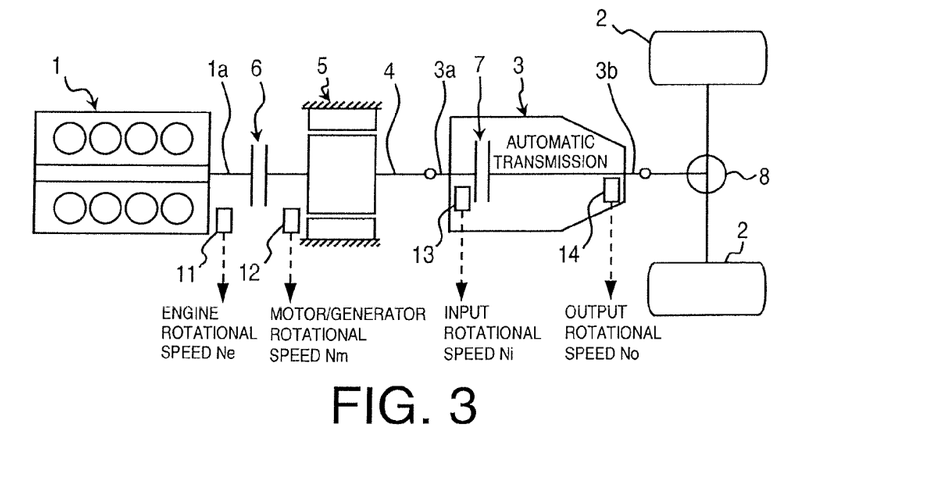
FIG. 3 is a schematic view of a power train of another hybrid vehicle which is equipped with the hybrid vehicle drive control apparatus in accordance with another embodiment.

Referring initially to FIGS. 1 to 3, a front engine/rear wheel drive vehicle (rear wheel drive hybrid vehicle) is illustrated in each of the Figures in which each of the hybrid vehicles is equipped with a hybrid vehicle drive control apparatus in accordance with one preferred embodiment. Although the illustrated embodiments are described in the form of an apparatus, the hybrid vehicle drive control can be realized as a method, a program, or a storage medium on which a program is stored so long as the method, program, or storage medium is substantially equivalent to the apparatus described above. It should be understood that such other forms, too, are included within the scope of the hybrid vehicle drive control disclosed herein. The steps of a method or program described below are executed using a CPU, DSP, or other computing device to process data as necessary, and inputted, manufactured, or generated data are stored on a magnetic tape, HDD, memory device, or other storage device.

Basically, the hybrid vehicles of FIGS. 1 to 3 illustrate three examples of alternate power trains of hybrid vehicles in which the hybrid vehicle drive control apparatus can be applied. In these examples, each hybrid vehicle includes, among other things, an internal combustion engine 1 with a crankshaft 1a, a pair of rear drive wheels 2, an automatic transmission 3 with an input shaft 3a, a power transfer shaft 4, a motor/generator 5, a first clutch 6 and a second clutch 7. In the power train of the hybrid vehicle shown in FIG. 1, the automatic transmission 3 is arranged longitudinally rearward of and in direct alignment (in tandem) with the engine 1 in the same manner as in a regular rear wheel drive automobile. The motor/generator 5 is operatively arranged on the shaft 4 that serves to transfer the rotation of the crankshaft 1a of the engine 1 to the input shaft 3a of the automatic transmission 3.

The motor/generator 5 is configured and arranged such that it can be used as a motor or an electric generator. The motor/generator 5 is operatively arranged between the engine 1 and the automatic transmission 3. The first clutch 6 is operatively arranged between the motor/generator 5 and the engine 1, i.e., more specifically, between the shaft 4 and the engine crankshaft 1a. The first clutch 6 is configured and arranged to selectively engage or disengage the connection between the engine 1 and the motor/generator 5. The first clutch 6 is configured and arranged such that the torque transfer capacity thereof can be changed either continuously or in a stepwise manner. For example, the first clutch 6 can be a multi-plate wet clutch, which is configured and arranged such that its torque transfer capacity can be changed by controlling the flow rate of a hydraulic clutch fluid (hydraulic oil) and the pressure of the hydraulic clutch fluid (clutch connection hydraulic pressure) either continuously or in a stepwise fashion by a proportional solenoid.

The second clutch 7 is provided between the motor/generator 5 and the automatic transmission 3, i.e., more specifically, between the shaft 4 and the transmission input shaft 3a. The second clutch 7 is configured and arranged to selectively engage or disengage the connection between the motor/generator 5 and the automatic transmission 3. Similarly to the first clutch 6, the second clutch 7 is configured and arranged such that the torque transfer capacity thereof can be changed either continuously or in a stepwise manner. For example, the second clutch 7 can be a multi-plate wet clutch configured such that its torque transfer capacity can be changed by controlling the flow rate of a hydraulic clutch fluid (hydraulic oil) and the pressure of the hydraulic clutch fluid (clutch connection hydraulic pressure) continuously or in a stepwise fashion by a proportional solenoid.

The automatic transmission 3 is configured and arranged such that a plurality of frictional holding elements (e.g., clutches and brakes) can be selectively engaged and disengaged. The the power transmission path (e.g., first gear, second gear, etc.) of the automatic transmission 3 is determined based on the combination of the engaged and disengaged friction elements. The automatic transmission 3 is transfers the rotation of the input shaft 3a to an output shaft 3b in accordance with a gear ratio corresponding to the selected gear position. The rotation of the output shaft 3b is distributed to the left and right rear wheels 2 by a differential gear unit 8 and thereby contributes to moving the vehicle. Of course, it will be apparent to those skilled in the art from this disclosure that the automatic transmission 3 is not limited to a step-type automatic transmission like that just described, and it is also acceptable to use a continuously variable transmission (CTV), which is capable of changing from a current gear ratio to a target gear ratio in a continuous (stepless) fashion.

Figure 7:
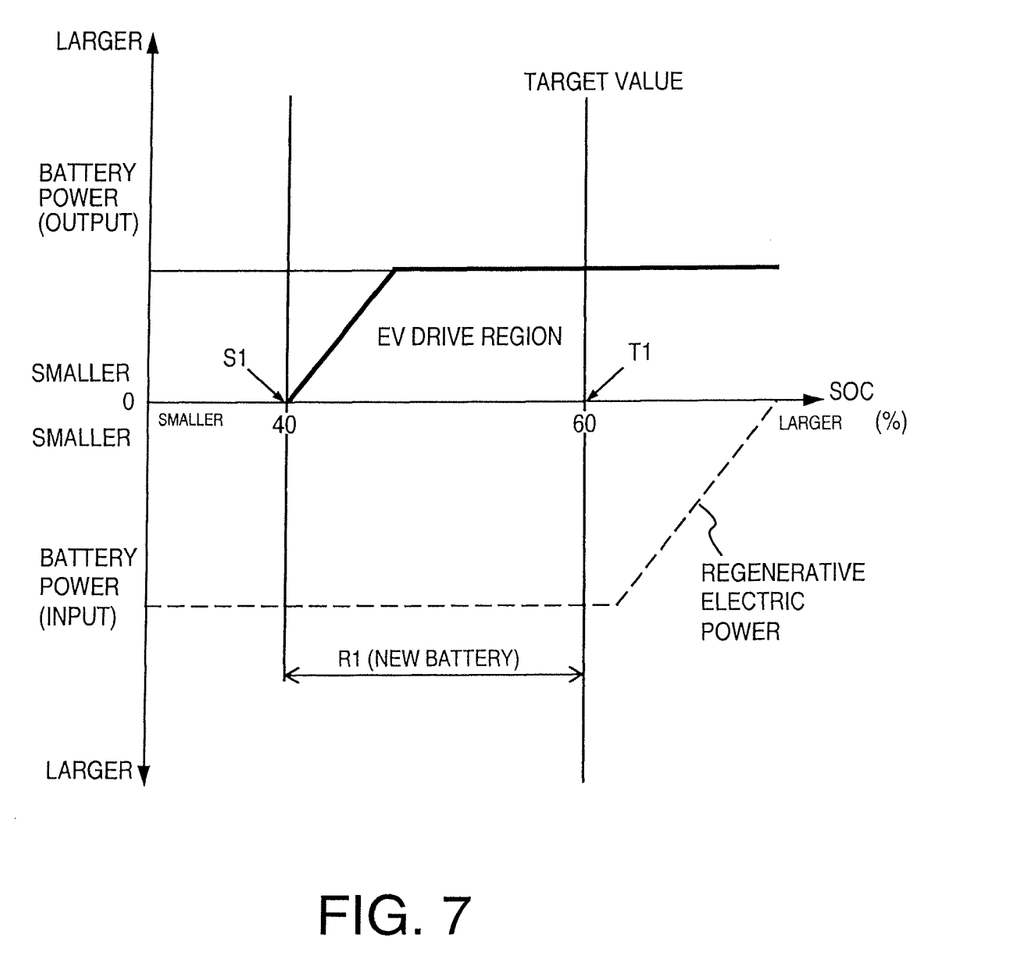
FIG. 7 is a map defining an EV drive region of a comparative example.

A comparative example that does not employ a control according to this embodiment will now be explained with reference to FIG. 7. The comparative example employs a power management control scheme in which regeneration and power usage are conducted such that an SOC value of the battery of the hybrid vehicle converges toward a "reference target value" at which both regeneration and power usage can be accomplished adequately. A lower limit SOC value indicating a minimum SOC value at which the vehicle can be driven in EV drive mode is set based on the performance of the battery when the battery is new. FIG. 7 is a map defining an EV drive region for such a comparative example. The positive side of the vehicle axis indicates battery power usage (output), and the negative side indicates battery power regeneration (input). The horizontal axis indicates the SOC (state of charge, %) of the battery. When the hybrid vehicle is shipped from the factory (i.e., when it is new), the SOC of the battery is set to a reference target value T1, e.g., 60%. While the hybrid vehicle is being driven, a control section of the hybrid vehicle executes control so as to conduct regeneration (recharging) and power usage (discharging) such that the SOC matches the reference target value T1. The lower limit SOC value S1 indicating the minimum SOC value at which the vehicle can be driven in EV drive mode is set to, for example 40%. A maximum power P1 at which the vehicle can be driven in EV drive mode is also set. Since the region defined by the SOC and the battery power in this way is a region in which the vehicle can be driven using power from the motor generator alone without using the engine, the region is called an "EV drive region."

Consider a case in which the vehicle is driven in the EV drive mode using an SOC range R1 in which driving in the EV drive mode is possible, i.e., the range from the reference target value T1 (60%) to the lower limit value S1. Since the SOC range R1 in which driving in the EV drive mode is possible is set based on the capacity of the battery when it is new, the vehicle can travel a prescribed distance in the EV drive mode when the battery is new. With a vehicle controlled based on such an EV drive region, the SOC value will always be the same along a given route, e.g., a route for going to work or a business route, assuming the traffic and/ other environmental conditions remain the same. Thus, the same amount of EV driving can be achieved. For example, if the vehicle is always driven at a low speed in a quiet residential neighborhood early in the morning and late at night, then the vehicle will always operate in the EV drive mode.

However, as the battery becomes degraded, even if the power management control achieves the reference target value T1 (60), the traveling distance (or time) that can be accomplished with the SOC range R1 (within which the vehicle can be driven in the EV drive mode) will gradually shorten. The reason for this is that as the battery degrades and its capacity declines, the amount of power that the battery can deliver with the same SOC range R1 (within which the vehicle can be driven in the EV drive mode) decreases. Thus, it is conceivable that the degradation of the battery will cause such a problem as the EV drive mode (i.e., driving the vehicle with the motor alone) becoming unusable, the engine starting, and the vehicle having to travel in the HEV drive mode (i.e., using both the motor and the engine) could occur when driving in the quiet residential neighborhood mentioned above. Since the engine will begin to start in situations where the vehicle had previously operated quietly in EV drive mode, the driver will experience a strong feeling that something is abnormal about the vehicle. Furthermore, the vehicle will loose its ability to operate quietly when driven (particularly when driven slowly), which is a major merit of using a hybrid vehicle. This embodiment solves the various problems just described.

With the power train shown in FIG. 1, when the electric drive (EV) mode is required, such as when starting into motion from a stopped state or otherwise traveling under low load, low speed conditions, the first clutch 6 is released and the second clutch 7 is engaged such that the automatic transmission 3 transmits power to the drive wheels 2. In this state, only output torque from the motor/generator 5 is transmitted to transmission input shaft 3a and the automatic transmission 3 transmits the torque from the input shaft 3a to the transmission output shaft 3b in accordance with a gear ratio corresponding to the selected gear position. The rotation of the transmission output shaft 3b is then transmitted through the differential 8 to the rear wheels 2. In this way, the hybrid vehicle can be driven electrically (in EV drive) using only the motor/generator 5.

When the hybrid drive (HEV) mode is required, such as when traveling at high speeds or under large load conditions, the first clutch 6 is engaged and the engine 1 is started using the motor/generator 5 as an engine starter. Both the first clutch 6 and the second clutch 7 are engaged and the automatic transmission 3 transmits power. In this state, an output torque from the engine 1 or output torques from both the engine 1 and the motor/generator 5 are transmitted to the transmission input shaft 3a and the automatic transmission 3 transmits the torque from the input shaft 3a to the transmission output shaft 3b in accordance with a gear ratio corresponding to the selected gear position. The rotation of the transmission output shaft 3b is then transmitted through the differential 8 to the rear wheels 2. In this way, the hybrid vehicle can be driven in a hybrid fashion (in HEV drive) using both the engine 1 and the motor/generator 5.

When the vehicle is driven in the HEV drive mode, there are times operating the engine 1 at optimum fuel efficiency causes the engine 1 to produce excess energy. The excess energy can be used to operate the motor/generator 5 as an electric generator and convert the excess energy into electrical energy. The generated electric energy can then be stored to be used later for driving the motor/generator 5 as a motor so as to improve the fuel efficiency of the engine 1.

Although in the example shown in FIG. 1 the second clutch 7 enabling the motor/generator 5 and the drive wheels 2 to be disconnected from each other is disposed between the motor/generator 5 and the automatic transmission 3, the same function can be accomplished by arranging the second clutch 7 between the automatic transmission 3 and the differential 8 as shown in FIG. 2.

Furthermore, although the examples shown in FIGS. 1 and 2 have a dedicated second clutch 7 that has been added to the drive train either in front of or behind the automatic transmission 3, it is also acceptable to use a frictional holding element that already exists inside the automatic transmission 3 for selecting a forward gear position or a reverse gear position as a second clutch 7 instead, as shown in FIG. 3. In addition to accomplishing the aforementioned mode selection function, such a second clutch 7 would also put the automatic transmission into a power transmission state when engaged, thus eliminating the need for a dedicated second clutch 7 and providing a significant cost advantage.

Figure 4:
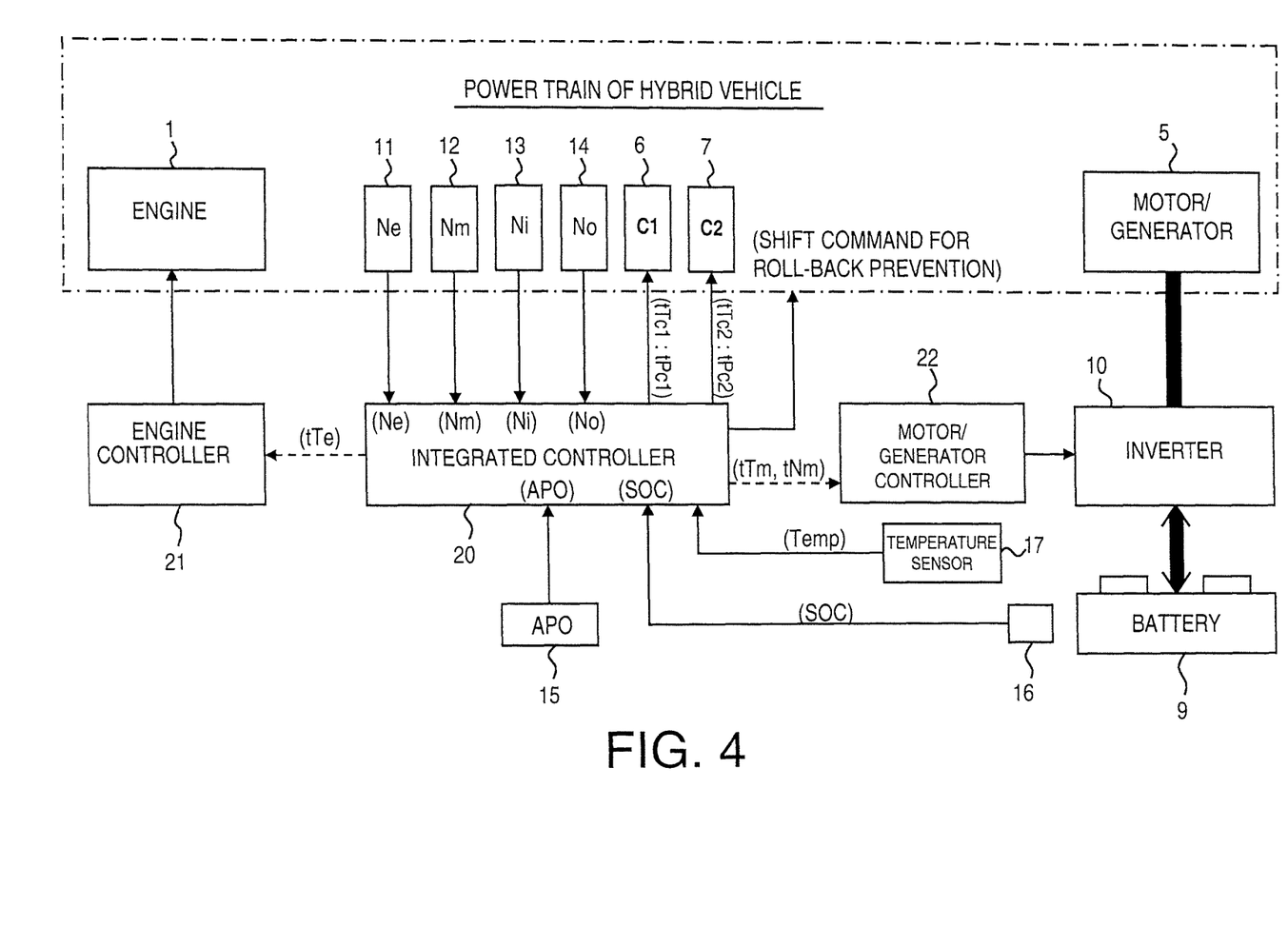
FIG. 4 is a block diagram showing a hybrid vehicle drive control apparatus for the power trains shown in FIGS. 1 to 3.

FIG. 4 is a block diagram illustrating a system for controlling the hybrid vehicle power train comprising the engine 1, the motor/generator 5, the first clutch 6, and the second clutch 7 as shown in FIGS. 1 to 3.

The operating point of the power train is set in terms of a target engine torque tTe, a target engine rotational speed tNe, a target motor/generator torque tTm, a target motor/generator rotational speed tNm, a target torque transfer capacity tTc1 of the first clutch 6, and a target torque transfer capacity tTc2 of the second clutch 7.

The control system shown in FIG. 4 has an integrated controller 20 that is configured to execute integrated control of an operating point (torque and rotational speed) of the power train. The integrated controller 20 is configured to specify the operating point of the power train in this example in terms of a target engine torque tTe, a target engine rotational speed tNe, a target motor/generator torque tTm, a target motor/generator rotational speed tNm, a target torque transfer capacity tTc1 of the first clutch 6, and a target torque transfer capacity tTc2 of the second clutch 7.

The integrated controller 20 preferably includes a microcomputer with a hybrid power transmitting control program that controls the operations of the engine 1, the motor/generator 5, and the first and second clutches 6 and 7. In other words, the microcomputer of the integrated controller 20 is programmed to control the operations of the engine 1, the motor/generator 5, and the first and second clutches 6. The integrated controller 20 also include other conventional components such as an input interface circuit, an output interface circuit, and storage devices such as a ROM (Read Only Memory) device and a RAM (Random Access Memory) device. It will be apparent to those skilled in the art from this disclosure that the precise structure and algorithms for the integrated controller 20 can be any combination of hardware and software that will carry out the functions of the present invention The integrated controller 20 operatively connected to the following sensors: an engine speed sensor 11, a motor/generator speed sensor 12, a transmission input rotational speed sensor 13, a transmission output rotational speed sensor 14, an accelerator pedal position sensor 15 and a state of charge sensor 16. The engine speed sensor 11, the motor/generator speed sensor 12, the input rotational speed sensor 13, and the output rotational speed sensor 14 are arranged as shown in FIGS. 1 to 3. The engine speed sensor 11 is configured and arranged to detect an engine speed Ne of the engine 1 and produce a signal indicative of the detected engine speed Ne that is inputted to the integrated controller 20. The motor/generator speed sensor 12 is configured and arranged to detect a rotational speed Nm of the motor/generator 5 and produce a signal indicative of the detected rotational speed Nm that is inputted to the integrated controller 20. The transmission input rotational speed sensor 13 is configured and arranged to detect a rotational speed Ni of the input shaft 3a of the automatic transmission 3 and produce a signal indicative of the detected rotational speed Ni that is inputted to the integrated controller 20. The transmission output rotational speed sensor 14 is configured and arranged to detect a rotational speed No of the output shaft 3b of the automatic transmission 3 and produce a signal indicative of the detected rotational speed No that is inputted to the integrated controller 20. The accelerator pedal position sensor 15 is configured and arranged to detect an accelerator pedal depression amount (accelerator position APO) indicating a requested drive force desired of the power train and produce a signal indicative of the detected accelerator pedal depression amount (accelerator position APO) that is inputted to the integrated controller 20. The state of charge sensor 16 is configured and arranged to detect a state of charge SOC (usable electric power that can be delivered) of the battery 9 in which electric power for the motor/generator 5 is stored and produce a signal indicative of the detected state of charge SOC that is inputted to the integrated controller 20. Thus, the integrated controller 20 receives these input signals for determining the operating point of the power train.

The integrated controller 20 is configured to select a drive (operating or traveling) mode (EV mode or HEV mode) that is capable of delivering the drive force desired by the driver based on the accelerator position APO, the battery state of charge SOC, and the transmission output rotational speed No (vehicle speed VSP) obtained from the input signals. Then the integrated controller 20 is configured to compute the target engine torque tTe, the target motor/generator torque tTm (target motor/generator rotational speed tNm also acceptable), the target first clutch torque transfer capacity tTc1, and the target second clutch torque transfer capacity tTc2. The target engine torque tTe is fed to the engine controller 21 and the target motor/generator torque tTm (or the target motor/generator rotational speed tNm) is fed to the motor/generator controller 22.

The engine controller 21 is configured to control the engine 1 such that the engine torque Te becomes equal to the target engine torque tTe. The motor/generator controller 22 is configured to control the motor/generator 5 through the battery 9 and an inverter 10 such that the torque Tm (or the rotational speed Nm) of the motor/generator 5 becomes equal to the target motor/generator torque tTm (or the target motor/generator rotational speed tNm).

The integrated controller 20 controls the connection or engagement force (holding force) of the first clutch 6 and the second clutch 7 such that the torque transfer capacity Tc1 of the first clutch 6 (first clutch pressure Pc1) becomes equal to the target first clutch torque transfer capacity tTc1 (first clutch command pressure tPc1) and such that the torque transfer capacity Tc2 of the second clutch 7 (second clutch pressure Pc2) becomes equal to the target torque transfer capacity tTc2 (second clutch command pressure tPc2). The integrated controller 20 accomplishes this control by supplying a solenoid current corresponding to the target first clutch torque transfer capacity tTc1 (first clutch command pressure tPc1) to a hydraulic control solenoid (not shown) of the first clutch 6 and supplying a solenoid current corresponding to the target second clutch torque transfer capacity tTc2 (second clutch command pressure tPc2) to a hydraulic control solenoid (not shown) of the second clutch 7.

In addition to selecting the operating mode (EV mode or HEV mode) and computing the target engine torque tTe, the target motor/generator torque tTm (target motor/generator rotational speed tNm), the target first clutch torque transfer capacity tTc1 (first clutch command pressure tPc1), and the target second clutch torque transfer capacity tTc2 (second clutch command pressure tPc2), the integrated controller 20 also executes an energy (power) management control program so as to control a target state of charge (reference target value) of the battery 9.

The control of the target state of charge will now be explained. A state of charge (SOC) of the battery 9 that is optimum from the standpoint of managing energy efficiently is called a reference target value (or reference target SOC). By controlling the SOC of the battery 9 to the reference target SOC, an excellent energy management can be executed by both recovering energy by conducting regenerative electricity generation while the vehicle is traveling and discharging recovered energy from the battery 9 so as to drive the vehicle using the motor/generator 5 as a motor. When the motor/generator 5 is operating as an electric generator or a motor, the motor/generator 5 exchanges electric power with the battery 9 serving as a power source (electric energy storage means) and the SOC of the battery increases or decreases. Thus, the SOC will temporarily deviate from the reference target SOC. However, the SOC is ultimately controlled to the reference target SOC.

Figure 5:
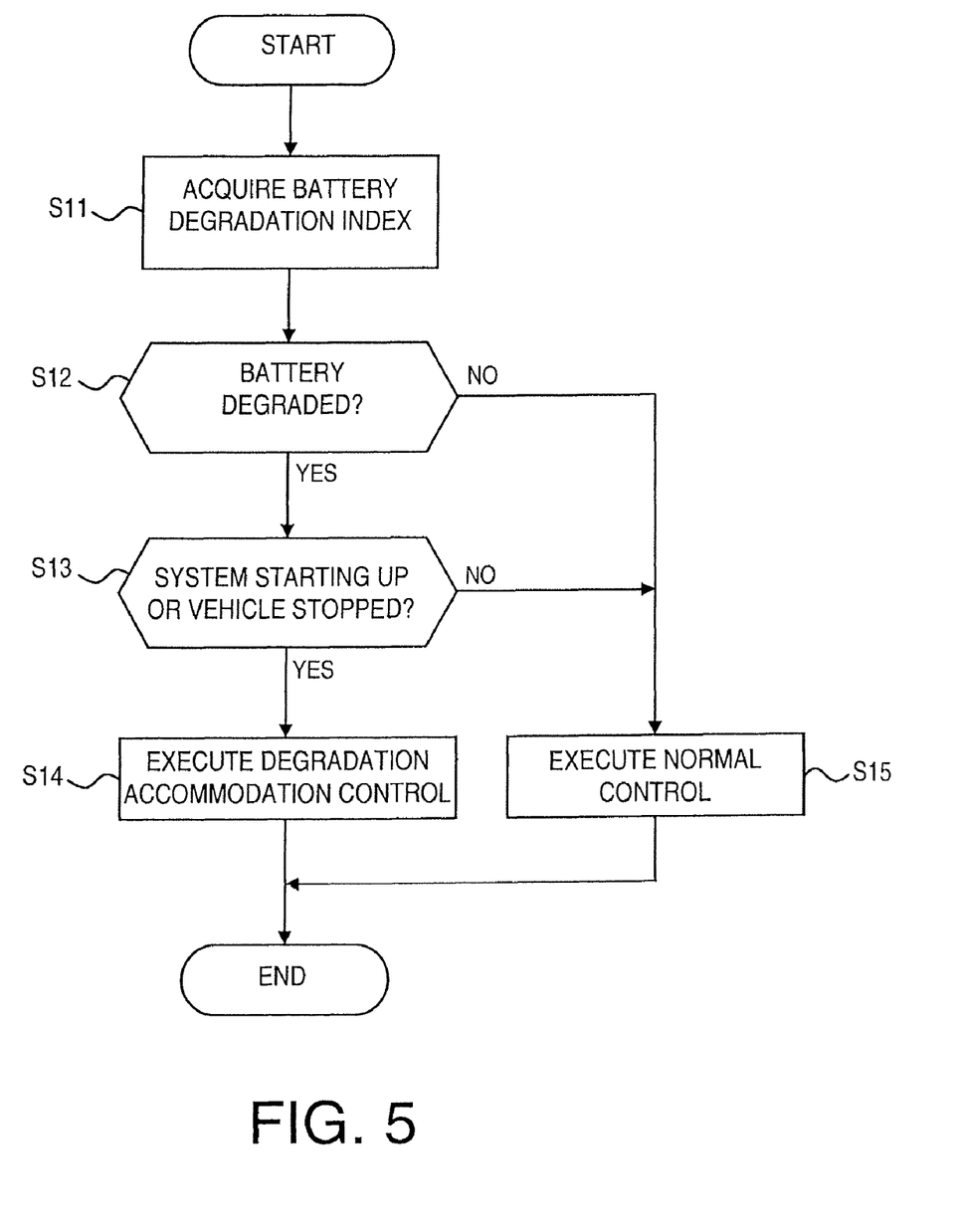
FIG. 5 is a flowchart showing a control in accordance with an illustrated embodiments.

FIG. 5 is a flowchart showing a control in accordance with the illustrated embodiment. This control can be executed by either the motor/generator controller 22 or the integrated controller 20. As shown in FIG. 5, in step S11 the controller (20 or 22) acquires (or calculates) a battery degradation index. The battery degradation index (degradation degree) can be calculated using a know technology, such as by measuring the internal resistance of the battery. In step S12, the controller (20 or 22) determines if the battery 9 has become degraded based on the acquired battery degradation index (or a battery degradation index estimated or calculated using a prescribed computation). More specifically, the controller (20 or 22) determines if the battery 9 is degraded by comparing the battery degradation index to a prescribed threshold value. In this example, the controller (20 or 22) constitutes a determining section configured to make the determination based on a battery degradation index estimated using a prescribed computation. The determination can be accomplished in a step-like fashion (e.g., a pluralit of non-linear preset regions) with a threshold value (e.g., a degradation index of 1.2) or in a linear fashion with the degradation index. If it determines that the battery 9 has become degraded, then in step S13 the controller (20 or 22) determines if the system is starting up (i.e., if the motor/generator controller or the integrated controller serving as a control section is starting up) or if the vehicle is stopped. In other words, step S13 expresses a condition for entering into a degradation accommodation control. Since the degradation accommodation control involves changing a table, the vehicle behavior could be affected (e.g., repeated engine starting could occur) depending on the calculation method by which the degradation is estimated. Therefore, it is preferable for the table to be changed when the vehicle is not moving.

Figure 6:
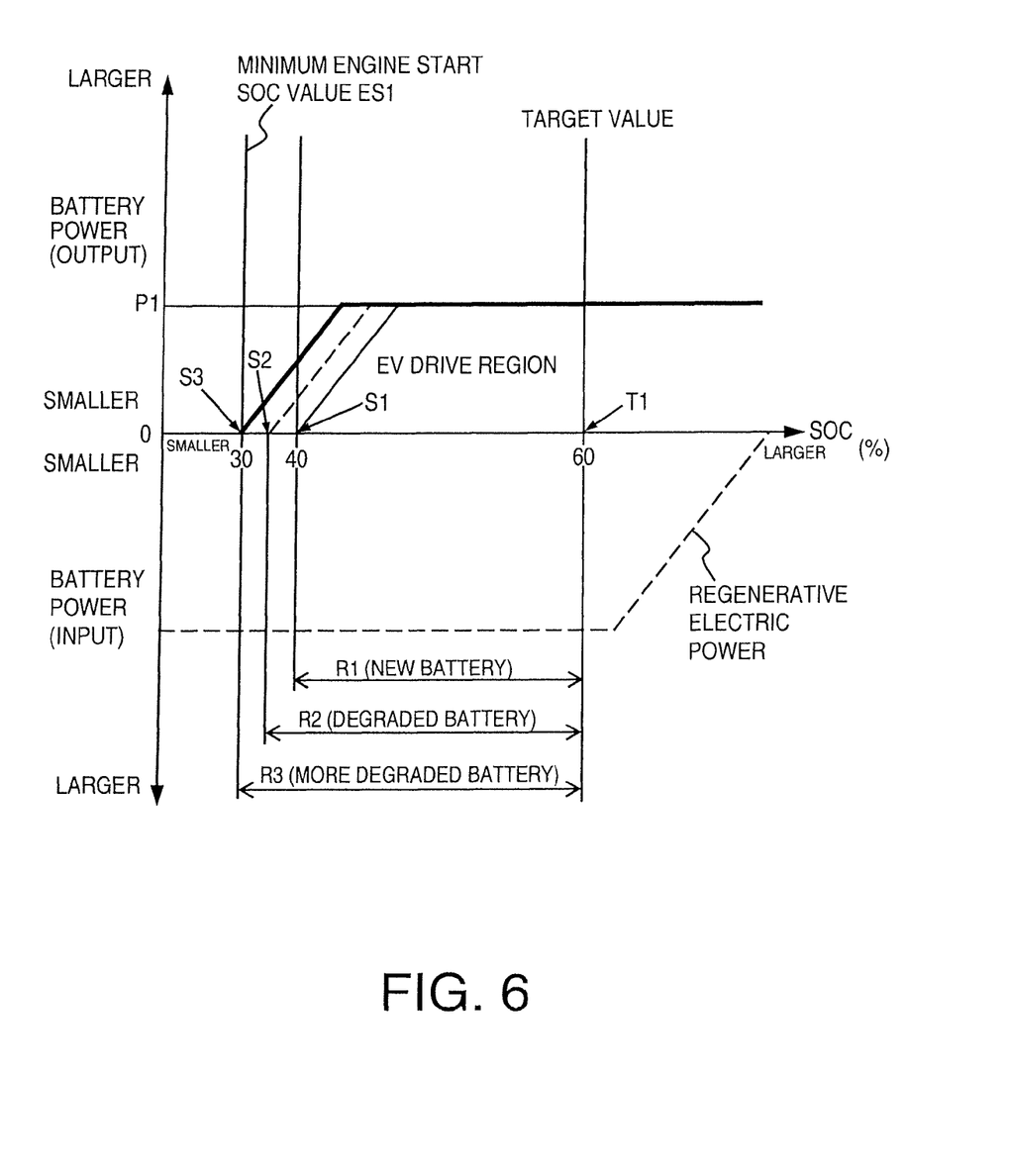
FIG. 6 illustrates a change of maps defining the EV drive region in accordance with the illustrated embodiments.

If the system is starting or the vehicle is stopped, then the controller (20 or 22) proceeds to step S14 and executes the degradation accommodation control. More specifically, as shown in FIG. 6, the EV drive region is expanded toward a lower SOC such that the EV continuous travel time (distance) obtained with the degraded battery is the same as when the battery was new. The EV drive region can be changed by switching among a plurality of tables like that shown in FIG. 6, or it can be changed in a linear fashion in accordance with the degradation index. After the degradation accommodation control is executed, this control sequence ends. Meanwhile, if it is determined in step S12 that the battery 9 is not degraded, then the controller (20 or 22) proceeds to step S15 and executes normal control before ending the control sequence.

FIG. 6 illustrates a change of maps defining the EV drive region in accordance with the illustrated embodiment. Elements that are the same as in FIG. 7 are indicated with the same reference numerals or letters. As shown in FIG. 6, the EV drive region having the SOC value S1 as a lower limit is the region used for normal control (when the battery is new). As the battery declines, the SOC value indicating the lower limit of the corresponding region moves linearly or in a step-like fashion from the value S1 toward a lower SOC value. For example, if the battery is degraded, then the EV drive region is expanded by moving the lower limit to an SOC value S2. The SOC value S2 is set such that the distance or amount of time that the vehicle can be driven in the EV drive mode by discharging the degraded battery from the reference target value T1 (60%) to the lower limit value S2 of the SOC range R2 is the same as the distance or amount of time that the vehicle can be driven in the EV drive mode by discharging a new battery from the reference target value T1 (60%) to the lower limit value S1 of the SOC range R1. Consequently, a driver does not experience any feeling that something is abnormal. When the battery has degraded even further, the EV range is expanded again by moving the lower limit to an SOC value S3. Since this vehicle is configured such that the engine is started with the motor/generator, the lower limit cannot be moved to an SOC value below an SOC value ESI that is the minimum SOC value at which the engine can be started. The SOC value ES1 is set such that the distance or amount of time that the vehicle can be driven in the EV drive mode by discharging the degraded battery from the reference target value T1 (60%) to the lower limit value ES1 of the SOC range R3 is the same as the distance or amount of time that the vehicle can be driven in the EV drive mode by discharging a new battery from the reference target value T1 (60%) to the lower limit value S1 of the SOC range R1 or a somewhat degraded battery from the reference target value T1 (60%) to the lower limit value S2 of the SOC range R2. Consequently, a driver does not experience any feeling that something is abnormal. Also, since the lower limit SOC value is not shifted beyond the SOC value ES1, i.e., the minimum SOC value at which the engine can be started, the power management can be controlled such that the ability to start the engine is ensured.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a vehicle equipped with the present invention. Accordingly, these terms, as utilized to describe the present invention should be interpreted relative to a vehicle equipped with the present invention.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function.

The term "configured" as used herein to describe a component, section or part of a device includes hardware and/or software that is constructed and/or programmed to carry out the desired function.

Moreover, terms that are expressed as "means-plus function" in the claims should include any structure that can be utilized to carry out the function of that part of the present invention.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A hybrid vehicle drive control apparatus comprising:
   an engine;
   a motor/generator;
   an electric power source operatively coupled to exchange electric power with the motor/generator; and
   a controller configured to select between an EV drive mode in which a drive force is produced solely from the motor/generator and an HEV drive mode in which the drive force is at least partially produced from the engine, with the EV drive mode and the HEV drive mode being based on at least a state of charge of the electric power source,
   the controller being further configured to change a state of charge region in which the EV drive mode is selected based on a degradation degree of the electric power source such that as the degradation degree of the electric power source becomes larger, the state of charge region in which the EV drive mode is selected becomes larger.

2. The hybrid vehicle drive control apparatus of claim 1, wherein
   the controller is further configured to stipulated an EV drive region for the EV drive mode based on the state of charge of the electric power source and an output power of the electric power source.

3. The hybrid vehicle drive control apparatus of claim 1, wherein
   the controller is further configured to enlarge the state of charge region in which the EV drive mode is selected in a direction of a lower state of charge in accordance with the degradation degree of the electric power source.

4. The hybrid vehicle drive control apparatus of claim 1, wherein
   the controller is further configured to change the state of charge region in which the EV drive mode is selected only when the hybrid vehicle is stopped or when the controller is being started up.

5. The hybrid vehicle drive control apparatus of claim 1, wherein
   the controller is further configured to use the motor/generator to a starter for starting the engine, and
   the controller is further configured to enlarge the state of charge region in which the EV drive mode is selected in accordance with the degradation degree of the power source such that the state of charge region is enlarged to a range in which the engine can be started by the motor/generator.

6. The hybrid vehicle drive control apparatus of claim 1, further comprising:
a clutch disposed between the engine and the motor/generator to connect and disconnect a transmission of power, and
the controller being further configured to release the clutch when the hybrid vehicle operates in the EV drive mode and connect the clutch when the vehicle operates in the HEV drive mode.

7. A hybrid vehicle control method comprising:
selecting between an EV drive mode in which only a drive wheel force of a motor/generator is used for driving a hybrid vehicle and an HEV drive mode in which drive wheel force of an engine is at least partially used for driving the hybrid vehicle, with the EV drive mode and the HEY drive mode being based on at least a state of charge of an electric power source for the motor/generator,
the control means further performing a function of changing a state of charge region in which the EV drive mode is selected based on the degradation degree of the electric power source such that as the degradation degree of the electric power source becomes larger, the state of charge region in which the EV drive mode is selected becomes larger.

* * * * *